United States Patent [19]

Brizzi et al.

[11] Patent Number: 5,746,300
[45] Date of Patent: May 5, 1998

[54] STORAGE UNIT FOR ELONGATED ELEMENTS PARTICULARLY CIGARETTES

[75] Inventors: Marco Brizzi, Zola Predosa; Andrea Fantini, Calderara Di Reno; Antonio Gamberini, Bologna, all of Italy

[73] Assignee: G.D Societa' Per Azioni, Bologna, Italy

[21] Appl. No.: 662,495

[22] Filed: Jun. 13, 1996

[30] Foreign Application Priority Data

Jun. 14, 1995 [IT] Italy ........................... B095A0302

[51] Int. Cl.[6] ................................................. B65G 1/00
[52] U.S. Cl. ............................ 198/347.3; 198/347.2
[58] Field of Search ........................ 198/347.1, 347.2, 198/347.3

[56] References Cited

U.S. PATENT DOCUMENTS 4,254,858  3/1981  Seragnoli ..................... 198/347.3
4,574,938  3/1986  Orlandi ....................... 198/347.3
4,872,543  10/1989  Hinchcliffe .................. 198/347.3
5,316,122  5/1994  Taddia et al. ................. 198/347.3

FOREIGN PATENT DOCUMENTS 1299174  12/1972  United Kingdom.

Primary Examiner—James R. Bidwell
Attorney, Agent, or Firm—Ladas & Parry

[57] ABSTRACT

A storage unit for elongated elements, particularly cigarettes, wherein a mass of cigarettes is supported on a first conveyor movable both ways through a loading-unloading station where the first conveyor is connected to a second conveyor by a connecting plate; the first conveyor being defined by a helical conveyor belt presenting at least two longitudinal grooves defining, on the conveyor belt, at least two longitudinal bands, each presenting a respective succession of projections; and the connecting plate presenting a comb-shaped free end connected to the longitudinal grooves of the first conveyor.

6 Claims, 3 Drawing Sheets

1

STORAGE UNIT FOR ELONGATED ELEMENTS PARTICULARLY CIGARETTES

BACKGROUND OF THE INVENTION

The present invention relates to a storage unit for elongated elements, particularly cigarettes.

In the following description, specific reference is made, purely by way of example, to a storage unit of the type described in U.S. Pat. No. 4,254,858—to which full reference is made herein in the interest of full disclosure—and which is interposed between cigarette manufacturing and packing machines to compensate for any difference in the output of the machines.

The above prior patent relates to a storage unit comprising a conveyor belt movable both ways along a cylindrical coil to feed a mass of cigarettes to and from a loading-unloading station defined by a conveyor and by a connecting plate for connecting the conveyor to the conveyor belt, which, to lock the plate transversely in a given position, presents a longitudinal groove engaged by a tapered end of the plate.

Actual use of the above storage unit has shown that the transverse stability of the connecting plate is of vital importance for ensuring efficient operation of the store when loading and unloading, and that such stability is increased alongside an increase in the width of the longitudinal groove. It has also been shown, however, that an increase in the width of the groove reduces the transverse stability of the cigarettes on the conveyor belt, and the ability of the belt to convey the cigarettes in one direction or the other without transverse slippage.

SUMMARY OF THE INVENTION

It is an object of the present invention to provide a storage unit of the above type, wherein enhanced transverse stability of the connecting plate is accompanied by satisfactory transverse stability of the cigarettes on the conveyor belt.

According to the present invention, there is provided a storage unit for elongated elements, particularly cigarettes, the storage unit comprising a first and second reversible conveyor for said elongated elements; and a loading-unloading station connecting said first and second conveyors; the first conveyor being defined by a helical conveyor belt; and said station comprising a connecting plate presenting an end portion connected in axially-sliding, transversely-fixed manner to said conveyor belt; the storage unit being characterized in that the conveyor belt presents at least two longitudinal grooves defining, on the conveyor belt, two longitudinal bands; the end portion of the connecting plate being a comb-shaped end portion connected to the longitudinal grooves of the first conveyor; and each said band presenting a respective succession of projections.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
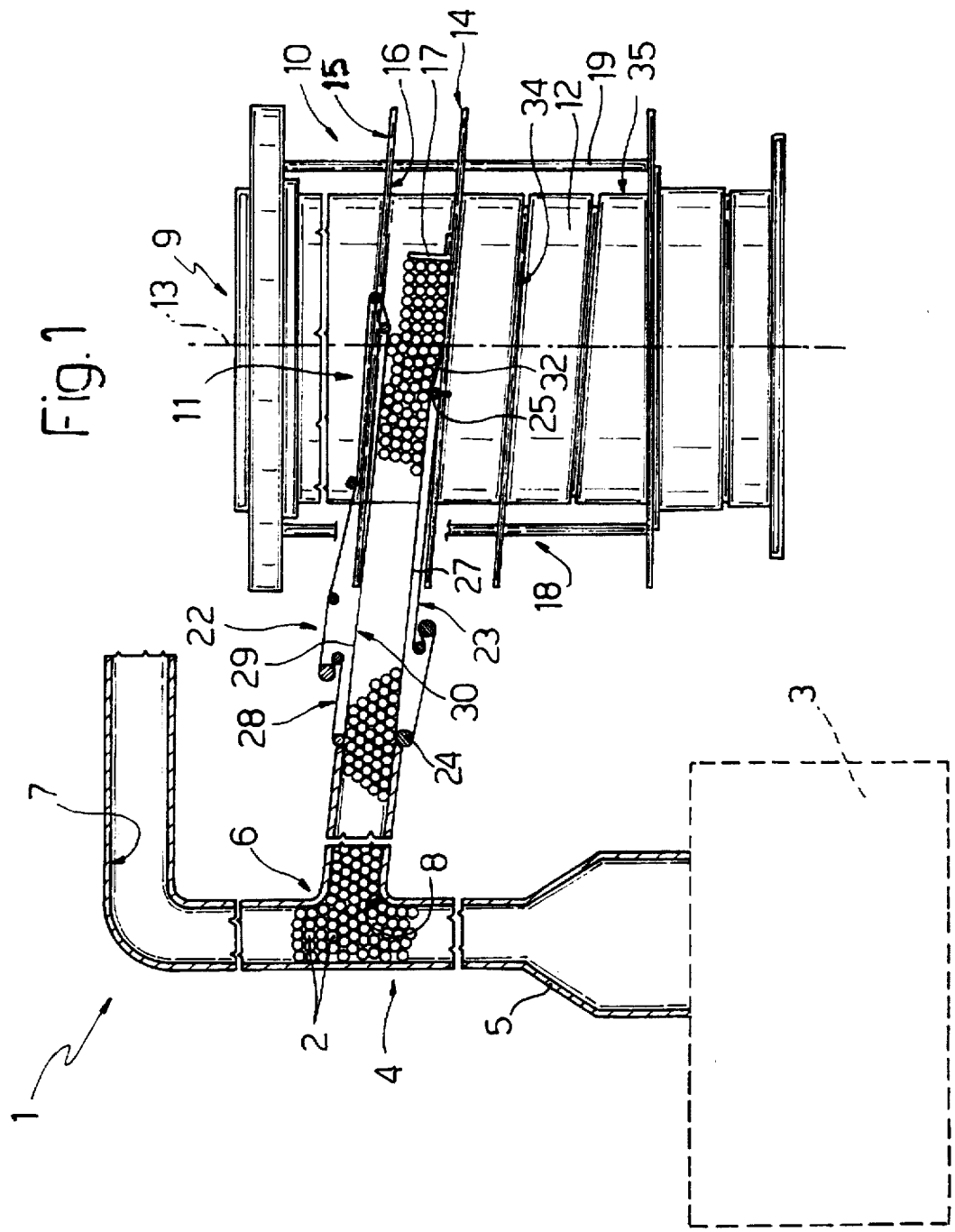
FIG. 1 shows a schematic side view of a preferred embodiment of the storage unit according to the present invention and associated with a user machine.

Number 1 in the accompanying drawings indicates a conveyor assembly for transferring cigarettes 2 from one or more cigarette manufacturing machines (not shown) to a packing machine 3. Assembly 1 comprises a dropdown channel 4 connected at the bottom to the input of a feedbox 5 of packing machine 3, and extending downwards from a junction 6, which receives cigarettes 2 in bulk from an upper feed channel 7 at the output of the manufacturing machine/s (not shown). Via a lateral opening 8, junction 6 communicates with a storage unit 9 acting as an intermediate store between the manufacturing machine/s (not shown) and packing machine 3.

Figure 2:
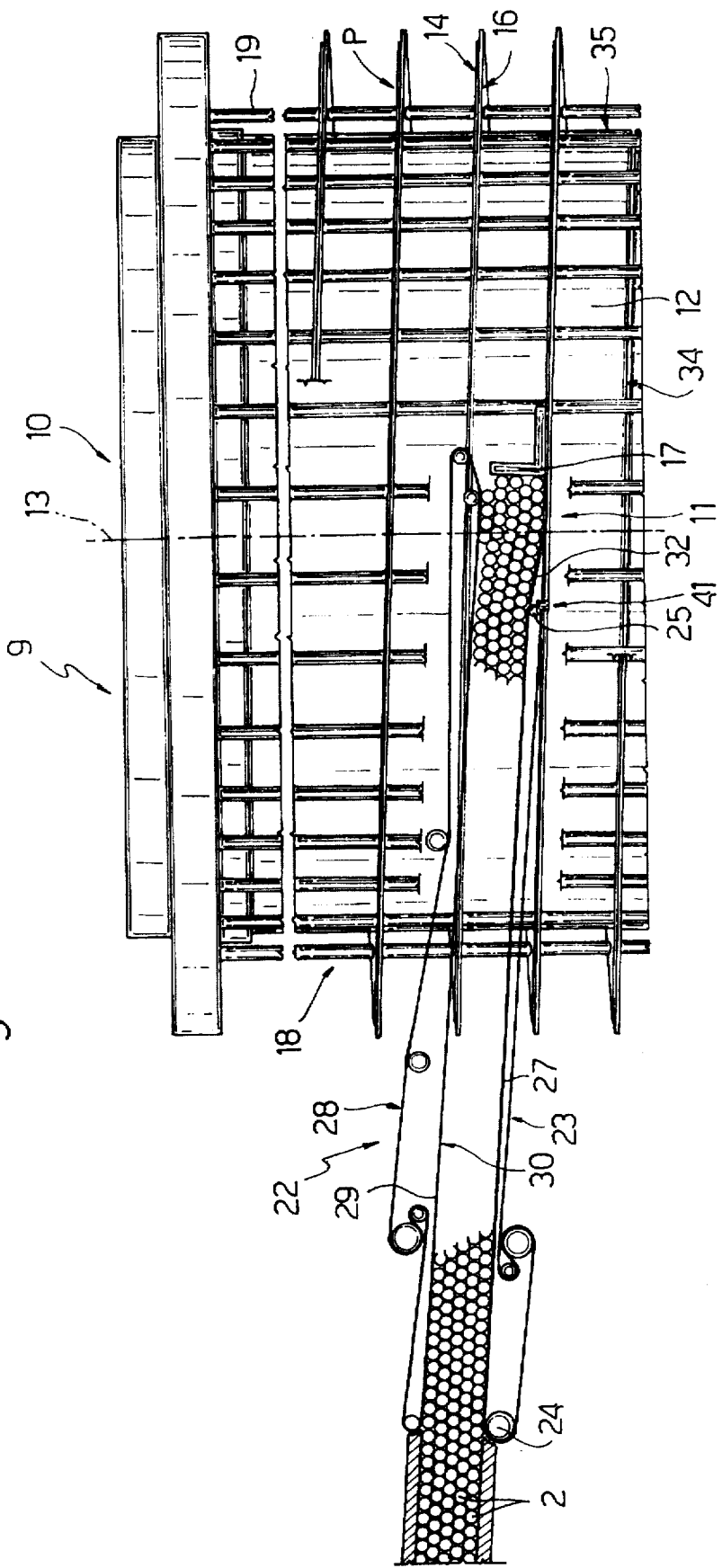
FIG. 2 shows a larger-scale detail of FIG. 1.

As shown in FIGS. 1 and 2, unit 9—a more detailed description of which may be found in said U.S. Pat. No. 4,254,858—comprises a variable-capacity store 10 presenting a station 11 where store 10 is loaded and unloaded. Store 10 in turn comprises a fixed supporting drum 12 with a substantially vertical axis 13; and a conveyor belt 14, which is movable about drum 12 along a helical path 15 extending through station 11, and is connected in sliding manner to drum 12 to define a helical conduit 16 of variable length and for receiving a number of cigarettes 2 positioned radially in relation to drum 12. More specifically, belt 14 is fitted integral with an end stop bracket 17, and is moved in relation to drum 12 by a known reversible actuating device 18, the output of which is represented by a number of rods 19 equally spaced about and parallel to axis 13, and engaging in axially-sliding manner respective holes 20 (FIG. 3) formed along an inner portion 21 of belt 14. Device 18 provides for moving belt 14, in relation to drum 12, between a first limit position (not shown) corresponding to zero capacity of store 10 and wherein bracket 17 is located close to station 11, and a second limit position (not shown) corresponding to maximum capacity of store 10.

Unit 9 also comprises a reversible conveyor 22 for masses of cigarettes 2, and in turn comprising a lower conveyor belt 23 looped about pulleys 24 and 25 fitted to a frame 26 (FIG. 3), and presenting an endless upper branch 27 substantially tangent to the surface of belt 14 at the end looped about pulley 25. Conveyor 22 also comprises an upper conveyor belt 28 facing belt 23 and presenting a lower branch 29, which, together with upper branch 27 of belt 23, defines a conduit 30 connecting junction 6 to conduit 16 and sloping more steeply than conduit 16. At station 11, branch 27 is connected to belt 14 by an end portion 31 of a bridge plate 32 connecting conduits 16 and 30, and which is supported on the ends of a shaft 25a (FIG. 3) supporting pulley 25, and is connected in sliding and transversely-fixed manner to belt 14 as described in more detail later on.

Figure 3:
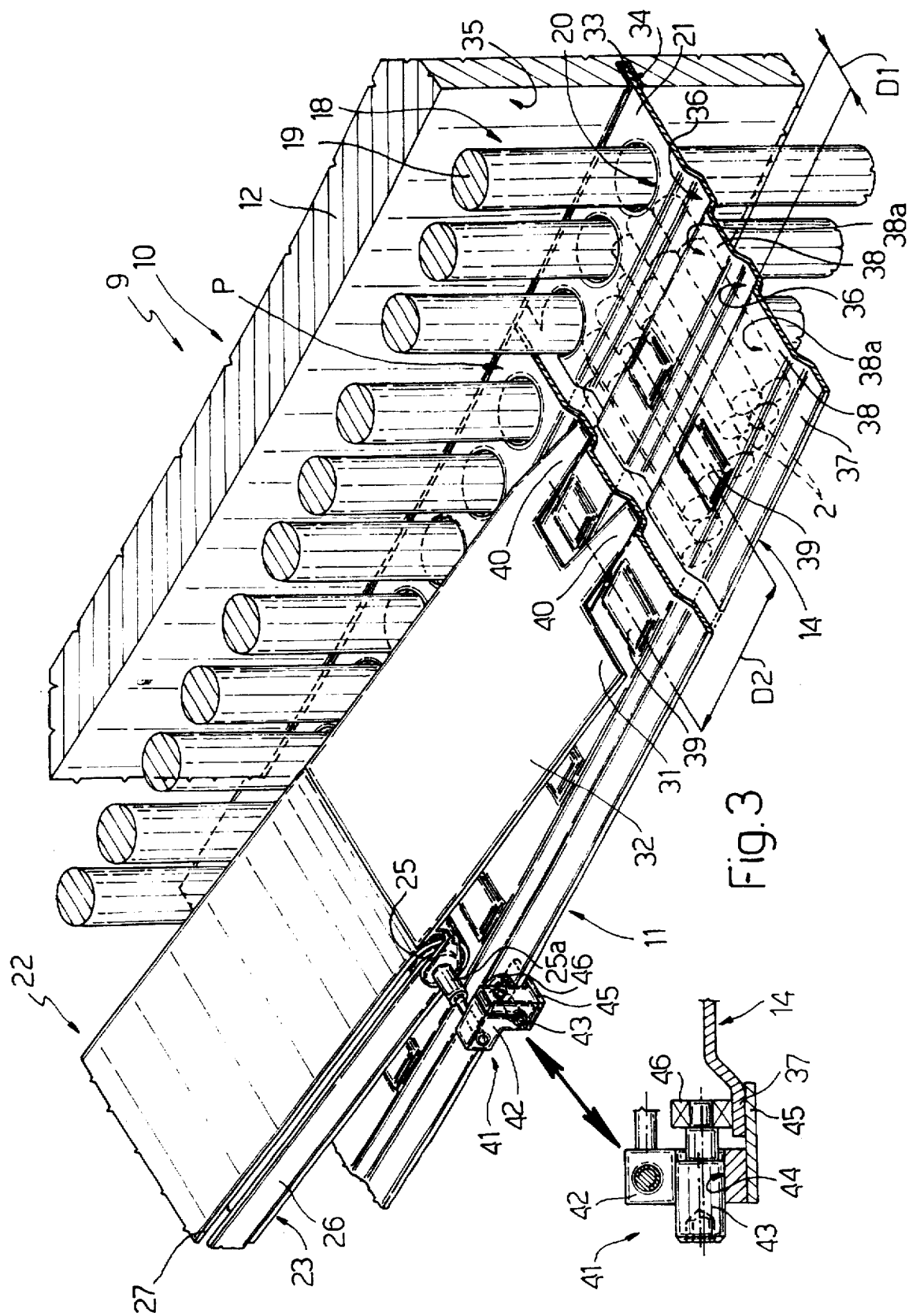
FIG. 3 shows a larger-scale view in perspective of a detail in FIG. 2.

As shown more clearly in FIG. 3, belt 14 presents one end 33 of portion 21 engaged in sliding manner inside a helical guide groove 34 formed coaxially with axis 13 along the cylindrical outer surface 35 of drum 12; and at least two longitudinal grooves 36 presenting a substantially trapezoidal section, and located between end 33 and a free peripheral portion 37 of belt 14, and on the opposite side of holes 20 to end 33. Grooves 36 extend parallel to each other along the whole length of belt 14, and define, on belt 14, at least two longitudinal bands 38 separated by a given distance D1 less than the length of cigarettes 2. Each band 38 presents a substantially trapezoidal section so as to define a respective upper supporting surface 38a for supporting only a longitudinal portion of cigarettes 2, and presents, on top, a respective number of preferably quadrangular projections 39 formed along respective surface 38a and separated by a given distance D2 such as to permit one or more cigarettes 2 to settle, in use, inside the gap between two successive projections 39.

More specifically, projections 39 are substantially rectangular, and the projections 39 on one band 38 are aligned radially with the corresponding projections 39 on the other band 38, so as to house cigarettes 2 between successive pairs of projections 39 and prevent, in use, any transverse slippage of the cigarettes 2 on projections 39 and both supporting surfaces 38a of bands 38, and so as to form a first transversely stable layer of cigarettes 2 for supporting the other layers of cigarettes 2 stacked on top of the first layer. In other words, by virtue of the particular arrangement of projections 39 along bands 38, cigarettes 2 in each layer are, in use, stabilized transversely by the cigarettes 2 in the underlying layers.

Finally, as shown in FIG. 3, end portion 31 of plate 32 is comb-shaped, and presents as many teeth 40 as the grooves 36 on belt 14. Teeth 40, which are two in number in the example embodiment shown in FIG. 3, are substantially trapezoidal when viewed from above, engage respective grooves 36 in sliding manner to ensure in-service transverse stability of plate 32, and are held inside grooves 36 by the weight of plate 32 and the cigarettes 2 stacked, in use, on plate 32, as well as by a safety device 41.

Device 41 is fitted to the free end of shaft 25a supporting pulley 25, and comprises a clamping element 42 integral with shaft 25a and facing the outer periphery of belt 14; a pin 43 fitted inside a through hole 44 in element 42 and locked by element 42 in a given angular position; a pad 45 fitted to element 42 and located beneath and contacting portion 37 of belt 14; and a rolling bearing 46 fitted to a free end of pin 43 eccentrically in relation to the common axis of pin 43 and hole 44, and which rolls on the upper surface of portion 37 so as to grip portion 37 adjustably and in sliding manner together with pad 45, and so prevent any oscillation of plate 32 on belt 14.

In actual use, when unit 9 is called upon to absorb a surplus output of the manufacturing machine/s (not shown) in relation to packing machine 3, device 18 operates belt 14 to move bracket 17 away from station 11 and so increase the capacity of store 10, and conveyor 22 receives cigarettes 2 from junction 6 and feeds them to store 10 through station 11. Conversely, when unit 9 is called upon to make up for a shortage in the output of the manufacturing machine/s (not shown) in relation to packing machine 3, device 18 operates belt 14 to move bracket 17 closer to station 11 and so reduce the capacity of store 10, and conveyor 22 feeds the cigarettes 2 from store 10 to junction 6.

In the first of the above operating modes of unit 9, belt 14 travels through station 11 to receive the mass of cigarettes 2 coming down off plate 32, and which settle on belt 14 in such a manner as to form a number of superimposed layers wherein the cigarettes 2 in the first layer lie across both surfaces 38a of bands 38, both directly on surfaces 38a themselves, in the gap between two successive projections 39, as well as on projections 39 themselves. As belt 14 travels through station 11, teeth 40 of plate 32 permanently contact and engage respective longitudinal grooves 36, while end portion 31 of plate 32 slides over belt 14 without interfering with projections 39.

In the second of the above operating modes of unit 9, belt 14 travels through station 11 in the opposite direction to the first mode, and feeds the mass of cigarettes 2 onto plate 32, the teeth 40 of which detach cigarettes 2, in particular those between two successive projections 39, off belt 14.

In addition to ensuring optimum support of cigarettes 2 on belt 14, longitudinal grooves 36 therefore also provide, in conjunction with teeth 40, for maintaining plate 32 transversely stable, and so preventing plate 32 from becoming detached from belt 14 and resulting, in the worst case, in cigarettes 2 being expelled from store 10. Moreover, projections 39 provide for considerably increasing the transverse stability of cigarettes 2 on belt 14.

We claim:

1. A storage unit (9) for elongated elements, particularly cigarettes (2), the storage unit (9) comprising a first (14) and second (22) reversible conveyor for said elongated elements (2); and a loading-unloading station (11) connecting said first and second conveyors (14, 22); the first conveyor (14) being defined by a helical conveyor belt (14); and said station (11) comprising a connecting plate (32) presenting an end portion (31) connected in axially-sliding, transversely-fixed manner to said conveyor belt (14); the storage unit being characterized in that the conveyor belt (14) presents at least two longitudinal grooves (36) defining, on the conveyor belt (14), two longitudinal bands (38); the end portion (31) of the connecting plate (32) being a comb-shaped end portion (31) connected to the longitudinal grooves (36) of the first conveyor (14); and each said band (38) presenting a respective succession of projections (39).

2. A unit as claimed in claim 1, characterized in that said end portion (31) of the connecting plate (32) presents teeth (40) equal in number to said longitudinal grooves (36); each of said teeth (40) engaging a respective longitudinal groove (36) in sliding and transversely-fixed manner.

3. A unit as claimed in claim 1, characterized in that each projection (39) on each said band (38) is aligned radially with a corresponding projection (39) on the other band (38).

4. A unit as claimed in claim 1, characterized in that said bands (38) present a substantially trapezoidal cross section.

5. A unit as claimed in claim 1, characterized in that said projections (39) are substantially rectangular.

6. A unit as claimed in claim 1, characterized by comprising an adjustable safety device (41) interposed between said first (14) and second (22) conveyors, for adjusting a mutual position of said first and second conveyors (14, 22); the safety device (41) being fitted integral with one end of said second conveyor (22), and being connected in sliding manner to said belt (14) of the first conveyor (14).

* * * * *